Jan. 8, 1929.　　　　　　　　　　　　　　　1,698,000
F. A. OST
POT DRAINING DEVICE FOR GLASS BLOWING MACHINES
Filed April 30, 1924　　　2 Sheets-Sheet 1
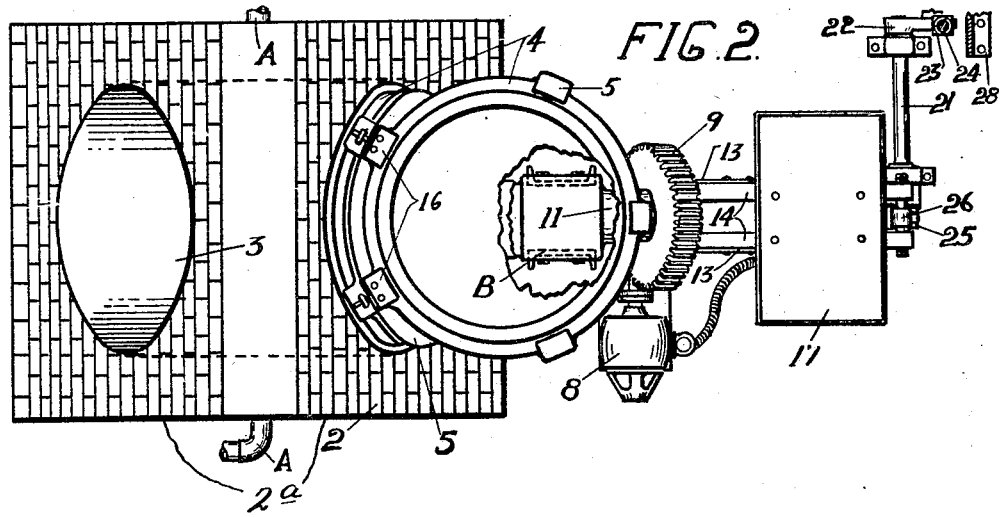
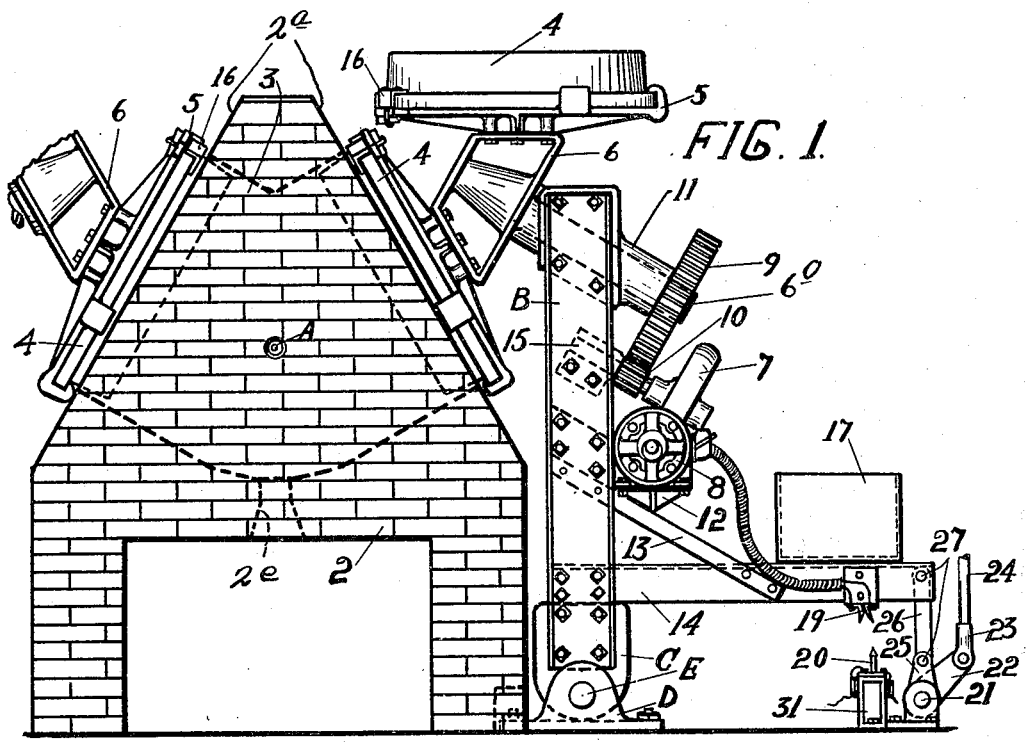
INVENTOR:
Frederick A. Ost,
BY F. G. Fischer
ATTORNEY.

Jan. 8, 1929.　　　　　　　　　　　　　　　　　1,698,000
F. A. OST
POT DRAINING DEVICE FOR GLASS BLOWING MACHINES
Filed April 30, 1924　　　2 Sheets-Sheet 2
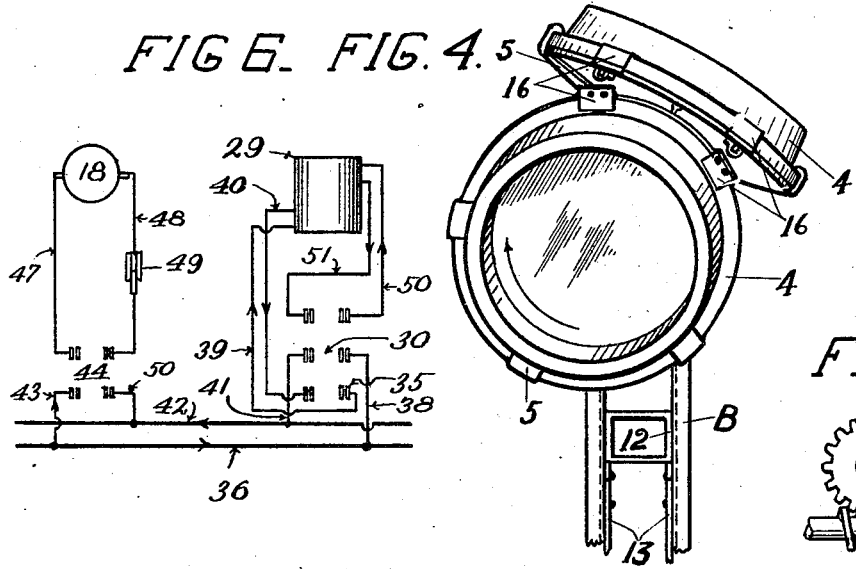
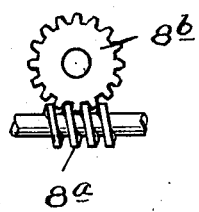
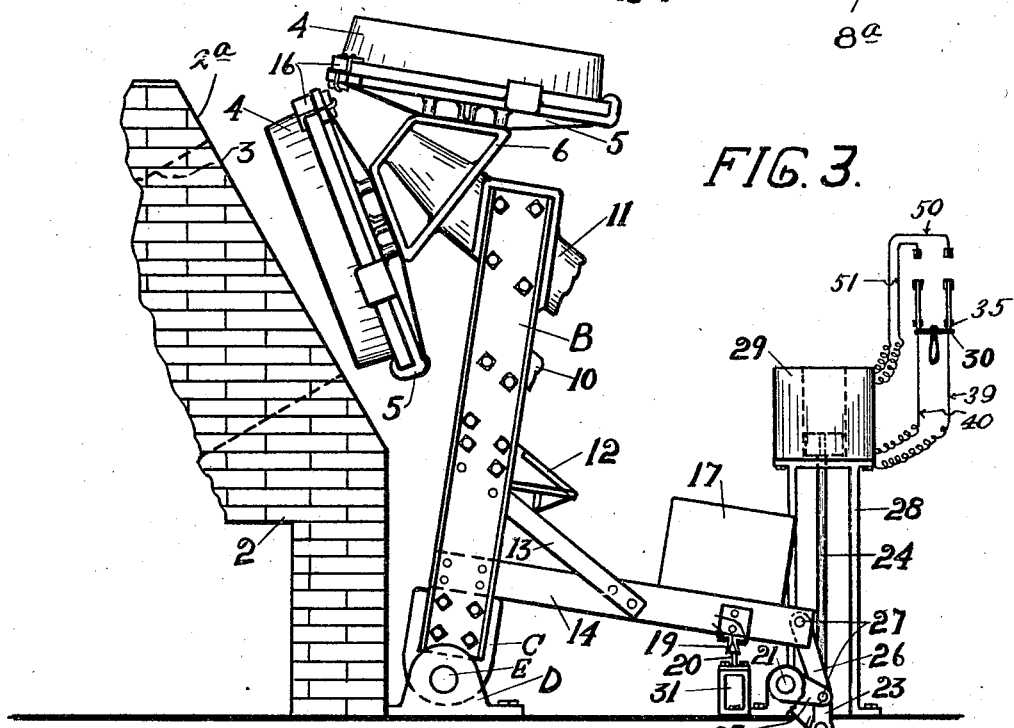
INVENTOR.
Frederick A. Ost,
BY F. G. Fischer,
ATTORNEY.

Patented Jan. 8, 1929.

1,698,000

UNITED STATES PATENT OFFICE.

FREDERICK A. OST, OF COFFEYVILLE, KANSAS.

POT-DRAINING DEVICE FOR GLASS-BLOWING MACHINES.

Application filed April 30, 1924. Serial No. 709,947.

My invention relates to improvements in means for draining pots used in connection with glass blowing machines and in which a residue is left after the glass blowing operation.

The primary object of the present invention is to provide novel means whereby said pots may be easily rotated and swung in and out of position with a kiln or furnace, the heat from which melts the congealed residue glass and causes the same to readily drain from the pots.

Another object is the provision of a furnace in which the combustion chamber is so constructed that two pots may be drained at the same time from a single furnace and thereby facilitate the drainage operation.

A further object is to provide a balanced tiltable support for the pot revolving mechanism, said balanced support providing means whereby the pots may be readily placed in or removed from the ends of the combustion chamber.

Another object is to provide electrically controlled means for actuating the tiltable support and the pot-revolving mechanism mounted upon said support, said electrically-controlled means embodying a circuit breaker whereby the circuit for actuating the pot revolving mechanism is automatically cut off as said pot is swung to position in the furnace.

Other objects will hereinafter appear and in order that the invention may be fully understood, reference will now be had to the accompanying drawings, in which:

Fig. 1 is a broken side elevation of the machine showing two pots in position in a single furnace.

Fig. 2 is a broken plan view of the parts shown by Fig. 1, with one of the pots removed.

Fig. 3 is a broken side elevation of the machine with one of the tiltable supports rocked backwardly preparatory to the placement or removal of one of the pots from the furnace.

Fig. 4 is a detail front elevation of two of the pots and a portion of their supporting mechanism, the pots being partly rotated from the position they occupy when one is in position in the furnace.

Fig. 5 is a detail elevation of worm gearing embodied in carrying out the invention.

Fig. 6 is a diagram of the circuits.

In carrying out the invention, I employ a furnace 2, two sides 2ª, of which slope upwardly towards each other, as best shown by Fig. 1. Said furnace 2 has a substantially V-shaped combustion chamber 3 having ends which are preferably circular and arranged at the sloping walls 2ª. Said combustion chamber 3 is heated by suitable means such as a gas burner A, and has an outlet 2ᶜ at its lower portion for the escape of the melted residue drained from the pots 4, which latter are of the same shape as the ends of the combustion chamber 3 in order to fit within said ends.

The pots 4 are supported in pairs as best shown by Figs. 1, 3 and 4, and each rests upon a base 5 upon which it is removably secured by suitable means such as clamps 16. The bases 5 are mounted in pairs upon a rotary head 6 arranged adjacent to the upper end of the column B of a tiltable frame consisting of said column B, members 14 extending rearwardly from said column B, braces 13 connecting the column B and said members 14, and a block C fixed to the lower end of the column B and connected to a base D by a pivot E. The rear portions of the members 14 of the tiltable frame are provided with a counterbalance consisting preferably of a receptacle 17, which may be filled with sand or other suitable material to counterbalance the two pots 4 and their revolving mechanism mounted at the upper portion of said column B.

Referring now to the mechanism for revolving the pots 4, 6ª designates a stub shaft fixed to the rotary head 6 and journaled in a bracket 11 bolted or otherwise secured to the upper end of the column B. Said shaft 6ª is driven by an electric motor 8 through a train consisting of a worm 8ª, a worm wheel 8ᵇ, a pinion 10, and a cog wheel 9. The motor 8 is mounted upon a bracket 12 carried by the braces 13 and the column B of the tiltable frame, while the shaft of the pinion 10 and worm wheel 8ᵇ is mounted in a housing 7 and a bearing 15 fixed to the said bracket 12 and the column B, respectively.

Referring now to the mechanism for controlling the tiltable frame, 21 designates a rock shaft provided with fixedly mounted cranks 22 and 25, which latter is connected to the rear ends of the tiltable frame members 14 by a link 26 which is connected to said crank 25 and the members 14 by pivots 27. The crank 22 is connected to the plunger 24 of a motor 29, which is supported at a suitable height above the rock shaft 21 by a standard 28. The motor 29 may be of any suitable type and in the drawings I have shown it in the form of a solenoid.

In practice the tiltable frame is tilted rearwardly to the position disclosed by Fig. 3, by throwing the switch 30 into engagement with the contacts 35. This establishes a circuit from the main 36 through a wire 38, one side of a double-throw switch 30, a wire 39, the lower part of the solenoid 29, a wire 40, the opposite side of the switch 30, a wire 41 and the main 42. Said circuit energizes the lower portion of the solenoid 29, causing its plunger 24 to move downwardly and through the intermediacy of its connections with the members 14 of the tiltable frame tilts said frame rearwardly as mentioned. As the frame tilts rearwardly a motor circuit is established from the main 36, through a wire 43, one side of a manual switch 44, a wire 47, a motor 18, a wire 48, a circuit breaker 19—20, the opposite side of the switch 44, a wire 50, and the main 42. The last-mentioned circuit energizes the motor 8, which, through the intermediacy of the intervening train, rotates the pots 4 until one is in position to enter the adjacent open end of the combustion chamber 3, as disclosed by Fig. 3. The position of the switch 30 is then reversed to close a circuit through the upper portion of the solenoid 29, through wires 50 and 51. The solenoid 29 then lifts the plunger 24, which, through the intermediacy of the intervening mechanism, swings the tiltable frame forwardly until the lowermost pot 4 enters the adjacent end of the combustion chamber 3, where it is subjected to the heat of the furnace until the residue is drained out. During such draining operation the upper pot 4 is in position for carrying on the glass blowing process in the usual manner. After the foregoing operations have been completed the tiltable frame is again swung backwardly to the position disclosed by Fig. 3. This last operation closes the circuit breaker 19—20 which closes the motor circuit and the pots 4 are rotated a half revolution to bring the undrained pot in position to enter the open adjacent end of the combustion chamber 3. The undrained pot is then placed in position in the end of the combustion chamber by again tilting the frame forward as above described.

From the foregoing it is apparent that by mounting the tiltable frame upon the pivot E, and counter-balancing it and the parts thereon with the weighted receptacle 17, very little power is required to move the pots 4 in and out of the adjacent end of the combustion chamber 3. It is also apparent that by automatically opening the circuit breaker 19—20 when the tiltable frame is adjusted forwardly to place a pot in the furnace that the motor circuit is automatically interrupted, and hence there will be no danger of the pots 4 being rotated while one is entering the furnace, and hence damage to the pots, the furnace and the rotary mechanism will be avoided.

While I have shown and described the preferred form of my invention, I reserve the right to make such changes in the construction, combination and arrangement of parts as properly fall within the spirit and scope of the invention as claimed.

Having thus described my invention, what I claim and desire to secure by Letters Patent, is:

1. In a machine of the character described a rockable frame, a pair of pots rotatably associated with said frame, and means for counter-balancing said frame and pots.

2. In a machine of the character described a pivotally-mounted column, mechanism rotatably associated with said column and arranged to support a pair of pots, and means for actuating said column to cause said pot-supporting mechanism to place one of the pots in a furnace and hold the companion pot in position for carrying on a glass blowing process.

3. In a machine of the character described a pivotally-mounted column, mechanism rotatably associated with said column and arranged to support a pair of pots, electrically controlled mechanism for rotating said pot supporting mechanism, means for actuating said column to cause the pot-supporting mechanism to place either pot in a furnace and support the companion pot in position for carrying on a glass blowing operation, and means for interrupting the circuit of the pot rotating mechanism as said column moves to place a pot in the furnace.

4. In a machine of the character described a pivotally-mounted column, mechanism rotatably associated with said column and arranged to support a pair of pots, electrically controlled mechanism for rotating said pot-supporting mechanism mounted on said column, means for actuating said column to cause the pot-supporting mechanism to place either pot in a furnace and support the companion pot in position for carrying on a glass blowing operation, and a circuit-breaker in the circuit of the pot rotating mechanism which is opened as said column moves to place a pot in the furnace.

5. In a machine of the character described a pivotally-mounted frame, mechanism rotatably associated with said frame and arranged to support a pair of pots, a rock-shaft provided with cranks, a link connecting the pivotally-mounted frame to one of said cranks, and electrically-controlled motive means connected to another crank to actuate said rock-shaft.

6. In a machine of the character described a pivotally-mounted frame, mechanism rotatably associated with said frame and arranged to support a pair of pots, a rock-shaft provided with cranks, a link connecting the pivotally-mounted frame to one of said cranks, and a solenoid connected to another crank to actuate said rock-shaft.

7. In combination a furnace having two oppositely-disposed side walls sloping towards the top and a combustion chamber extending through said furnace and terminating at said sloping walls, tiltable frames adjacent to the sloping walls of the furnace, and pot-carrying means mounted on said frames and adapted to place pots mounted on said carrying means within the ends of said combustion chamber.

8. In a machine of the character described, an upwardly extending column tiltably mounted at its lower portion, and a pot operably mounted at the upper portion of said column.

9. In a machine of the character described, an upwardly extending member tiltably mounted at its lower portion, a pair of pots operably mounted at the upper portion of said member, and mechanism for tilting said member backwardly and forwardly.

10. In a machine of the character described, an upwardly extending member tiltably mounted at its lower portion, a pot operably mounted at the upper portion of said member, and counterbalancing means for said member.

11. In a machine of the character described, an upwardly extending column tiltably mounted at its lower portion, rotary pot-supporting means at the upper forward portion of said column, and electrically driven mechanism for rotating said pot-supporting means and mounted at the rear of the column to partially counterbalance the latter.

12. In a machine of the character described, an upwardly extending member tiltably mounted at its lower portion, a pair of pots operably mounted at the upper portion of said member, an element projecting from said member, and mechanism for raising and lowering said element and thereby actuating said member.

13. In combination with a furnace having a combustion chamber with a circular end, a circular pot adapted to close said end, an upwardly extending member tiltably mounted at its lower portion in front of said furnace and mounting said pot at its upper portion, and mechanism for causing said member to carry the pot into and out of the circular end of the combustion chamber.

In testimony whereof I affix my signature.

FREDERICK A. OST.